United States Patent
Chen et al.

(10) Patent No.: US 10,687,664 B2
(45) Date of Patent: Jun. 23, 2020

(54) ROTARY BARBEQUE APPARATUS WITH FORWARD-REVERSE MOTOR

(71) Applicants: Jianlin Chen, Macheng (CN); Jun Niu, Barrie (CA)

(72) Inventors: Jianlin Chen, Macheng (CN); Jun Niu, Barrie (CA)

( * ) Notice: Subject to any disclaimer, the term of this patent is extended or adjusted under 35 U.S.C. 154(b) by 318 days.

(21) Appl. No.: 15/867,487

(22) Filed: Jan. 10, 2018

(65) Prior Publication Data

US 2019/0183286 A1 Jun. 20, 2019

(30) Foreign Application Priority Data

Dec. 19, 2017 (CN) .......................... 2017 1 1375465

(51) Int. Cl.
*A47J 37/04* (2006.01)
*A47J 37/07* (2006.01)
*A47J 36/32* (2006.01)

(52) U.S. Cl.
CPC ............. *A47J 37/041* (2013.01); *A47J 36/32* (2013.01); *A47J 37/0709* (2013.01); *A47J 37/0745* (2013.01); *A47J 37/0786* (2013.01)

(58) Field of Classification Search
CPC ...... A47J 37/041; A47J 36/32; A47J 37/0786; A47J 37/0745; A47J 37/0709; A47J 37/04; A47J 37/06
See application file for complete search history.

(56) References Cited

U.S. PATENT DOCUMENTS

| 6,114,666 | A | * | 9/2000 | Best | A47J 37/0713 126/39 BA |
| 6,131,505 | A | * | 10/2000 | Lin | A47J 37/041 403/386 |
| 6,810,793 | B1 | * | 11/2004 | Hsu | A47J 37/041 99/341 |
| 6,959,641 | B1 | * | 11/2005 | Yu | A47J 37/041 99/419 |
| 2011/0079210 | A1 | * | 4/2011 | Jackovitch | A47J 37/07 126/25 R |
| 2018/0296034 | A1 | * | 10/2018 | Wenzel | A47J 37/0704 |

* cited by examiner

*Primary Examiner* — Jun S Yoo
(74) *Attorney, Agent, or Firm* — Sinorica, LLC

(57) ABSTRACT

A rotary barbeque apparatus with a forward-reverse motor includes a machine, a cover, a barbeque tray, an electric heating tray, a temperature detection device, and a barbeque rack. A drive motor is installed at an end of the barbeque rack. The temperature detection device includes a temperature sensor and a temperature control device. The temperature sensor transmits a detected temperature to the temperature control device through a transmission cable. The drive motor is a forward-reverse motor. The temperature sensor is a probe directly inserted into a barbeque food for detecting the temperature of the barbeque food, so that a user may determine whether or not the food is cooked to effectively prevent the barbeque food from producing harmful chemical substances by a too-high temperature. To prevent damaging the transmission cable of the temperature sensor in the rotation of the barbeque rack, a forward-reverse rotating drive motor is adopted.

9 Claims, 5 Drawing Sheets

ROTARY BARBEQUE APPARATUS WITH FORWARD-REVERSE MOTOR

FIELD OF INVENTION

The present disclosure relates to the technical field of kitchenware, in particular to a rotary barbeque apparatus with a forward-reverse motor.

BACKGROUND OF INVENTION

1. Description of the Related Art

Barbeque is a common way of eating, and present existing barbeque stoves are primarily divided into charcoal barbeque or electric barbeque and secondarily into gas barbeque and microwave barbeque. Since it is not easy to control the temperature of the charcoal barbeque, and the charcoal barbeque stove has carbon and grease emissions, the charcoal barbeque is the most harmful one. Even if a barbeque stove uses a liquefied gas as fuel (which is known as a smokeless barbeque stove), the barbeque stove still emits chemical substances that may contaminate the food and the environment. On the other hand, microwave barbeque has the drawback of high radiation. Electric barbeque mainly uses an electric heating tube and an electric heating body such as an electric heating tray for heating, and the electric heating body is usually exposed from the bottom of the barbeque tray and keeps a certain distance from the barbeque tray, and thus the process of transmitting the heat from the electric heating body to the barbeque tray is mostly done by heat radiation or heat convection. Although the temperature of the electric heating body is controllable, the loss of the heat generated from different parts of the electric heating body and transmitted to the barbeque tray is different. Therefore, it is still difficult to control the temperature at the surface of the barbeque tray, and a non-uniform heating result may occur. Some automatic temperature controlled barbeque stoves simply set a fixed temperature range without detecting the temperature inside the barbeque stove. As a result, the barbeque food may be burned and chemical emissions may occur easily.

2. Summary of the Invention

It is a primary objective of the present disclosure to provide a rotary barbeque apparatus with a forward-reverse motor to overcome the drawbacks of the prior art.

To achieve the aforementioned and other objectives, the present disclosure provides a rotary barbeque apparatus with a forward-reverse motor, comprising: a machine, a cover, a barbeque tray, an electric heating tray, a temperature detection device, and a barbeque rack, characterized in that the cover is movably coupled to the top of the machine; the barbeque tray is installed between the machine and the cover; both left and right ends of the machine have a protrusion; the electric heating tray is installed to the bottom of the protrusion; the protrusion has a groove formed thereon, both ends of the barbeque rack are rotatably and respectively coupled into the grooves of the protrusions; an end of the barbeque rack has a drive motor with an output end transmitted and coupled to the barbeque rack; the temperature detection device comprises a temperature sensor and a temperature control device, the temperature sensor sends a detected temperature to the temperature control device through a transmission cable; and the drive motor is a forward-reverse motor.

Preferably, the barbeque rack comprises a rotating rod, a barbeque fork, a roller, and a balancing handle, and the barbeque fork is installed to the rotating rod, and the rotating rod is installed to the groove through the roller, and the balancing handle is installed to the rotating rod.

Preferably, the barbeque fork comes with a quantity of at least two, and the barbeque forks are uniformly distributed on the rotating rod, and each of the barbeque forks includes a plurality of barbeque fork rods.

Preferably, the cover has a give-way portion disposed on both left and right sides of the bottom of the cover.

Preferably, the electric heating tray comes with a plural quantity, and each of the electric heating trays has a control switch installed thereto.

Preferably, the electric heating trays are stacked into a plurality of layers.

Preferably, the barbeque tray has an oil basin disposed at the bottom of the barbeque tray for collecting a barbeque waste oil, and the top of the oil basin is in an open form.

Preferably, the machine has a mounting portion disposed thereon for installing the drive motor, and the drive motor is installed to the mounting portion by a screw.

Preferably, the temperature control device includes a display screen.

Preferably, the cover has a window made of a transparent material, and a ventilation hole provided for ventilation.

The rotary barbeque apparatus of this disclosure has the following advantages:

In the rotary barbeque apparatus with a forward-reverse motor of this disclosure, the barbeque rack may be rotated on the machine, and the barbeque rack has the temperature sensor installed thereto. Compared with the conventional barbeque stove, the temperature sensor of this disclosure is a probe inserted directly into a barbeque food for directly detecting the temperature of the barbeque food, so that a user may detect whether or not the food is cooked to effectively prevent the barbeque food from producing harmful chemical substance caused by a too-high temperature. In order to prevent damaging the transmission cable of the temperature sensor during the rotation of the barbeque rack, a forward-reverse rotating drive motor is used as the drive motor of this disclosure.

DESCRIPTION OF THE EMBODIMENTS

Figure 1:
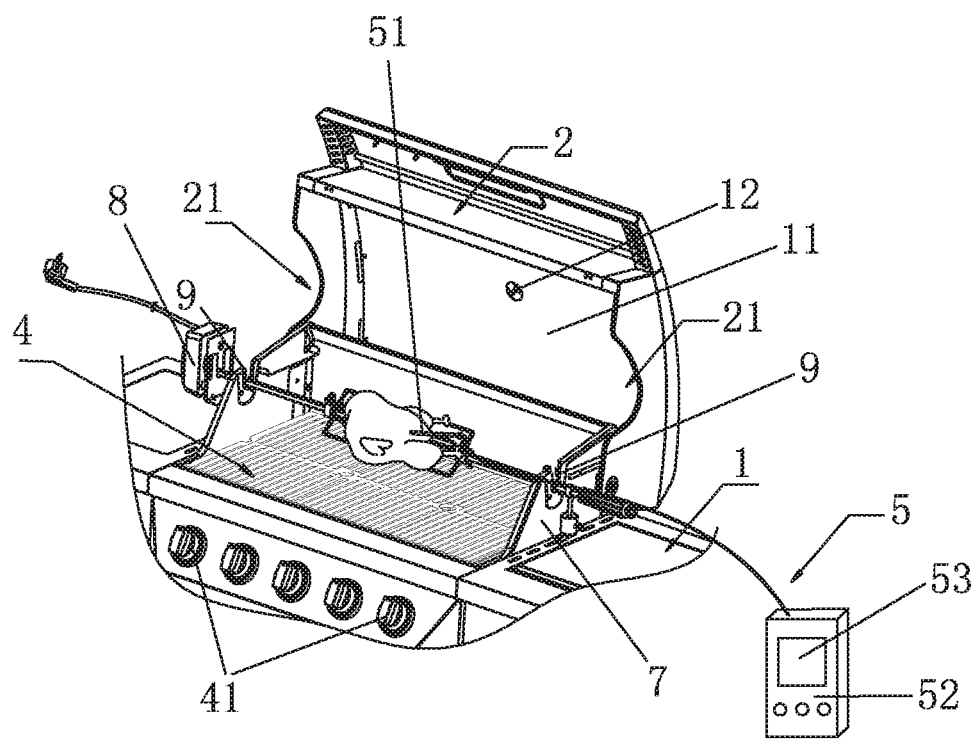
FIG. 1 is a schematic view of the structure of the present disclosure.

The above and other objects, features and advantages of this disclosure will become apparent from the following detailed description taken with the accompanying drawings. Only some embodiments of the present disclosure have been illustrated in the drawings, but it should be pointed out that many other modifications are conceivable within the scope of the following claims.

With reference to FIGS. 1 to 5 for a rotary barbeque apparatus with a forward-reverse motor in accordance with this disclosure, the rotary barbeque apparatus comprises a machine 1, a cover 2, a barbeque tray 3, an electric heating tray 4, a temperature detection device 5, and a barbeque rack 6, wherein the cover 2 is movably coupled to the top of the machine 1, and the barbeque tray 3 is installed between the machine 1 and the cover 2, and both left and right ends of the machine 1 have a protrusion 7, and the electric heating tray 4 is installed to the bottom of the protrusion 7, and the protrusion 7 has a groove 9 formed thereon, and both ends of the barbeque rack 6 are rotatably coupled into the groove 9 of the protrusion 7, and an end of the barbeque rack 6 has a drive motor 8 with an output end transmitted and coupled to the barbeque rack 6. The temperature detection device 5 comprises a temperature sensor 51 and a temperature control device 52, wherein the temperature sensor 51 sends a detected temperature to the temperature control device 52 through a transmission cable, and the drive motor 8 is a forward-reverse motor 8. In this disclosure, the barbeque rack 6 may be rotated on the machine 1, and the barbeque rack 6 has a temperature sensor 51 installed thereto. Compared with the conventional barbeque stove, the temperature sensor of this disclosure is a probe directly inserted into a barbeque food during the barbeque process. The temperature control device 52 includes a display screen 53 provided for checking the temperature of the barbeque food directly, so that a user may determine whether or not the barbeque food is cooked according to the temperature sensor 51 and further effectively prevent producing harmful chemical substances in the too-high temperature process. In order to prevent damaging the transmission cable of the temperature sensor 51 during the rotation of the barbeque rack 6, a forward-reverse rotating drive motor 8 is used as the drive motor 8 of this disclosure. Preferably, the drive motor 8 drives the barbeque rack 6 to rotate 180 degrees in the forward direction, and then rotate 180 in the reverse direction, and such operation is repeated, wherein the rotation angle may be 180 degrees to 360 degrees.

Figure 2:
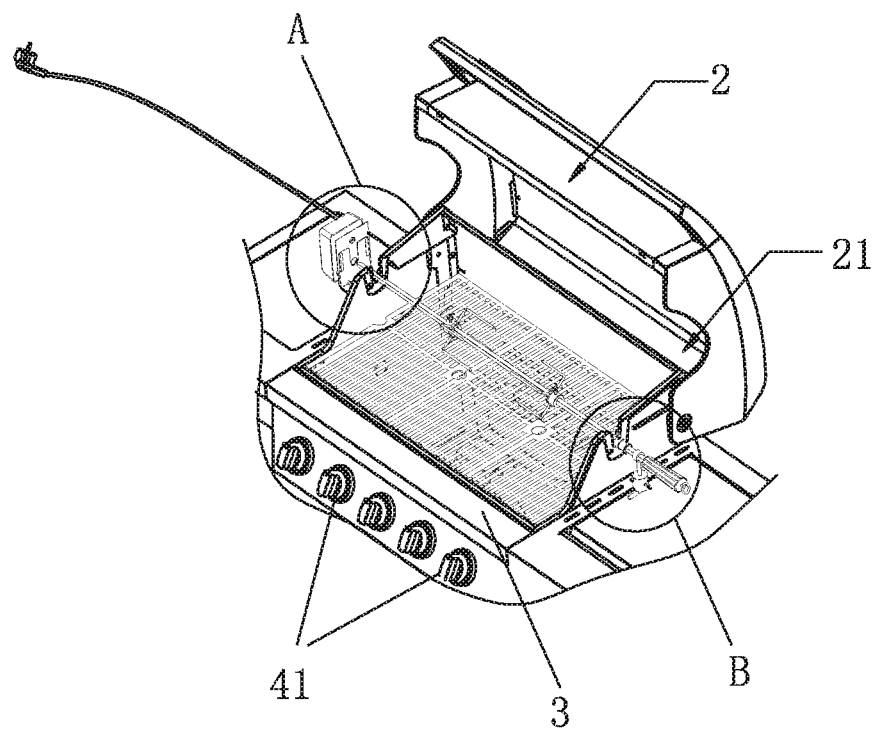
FIG. 2 is another schematic view of the structure of the present disclosure.
Figure 5:
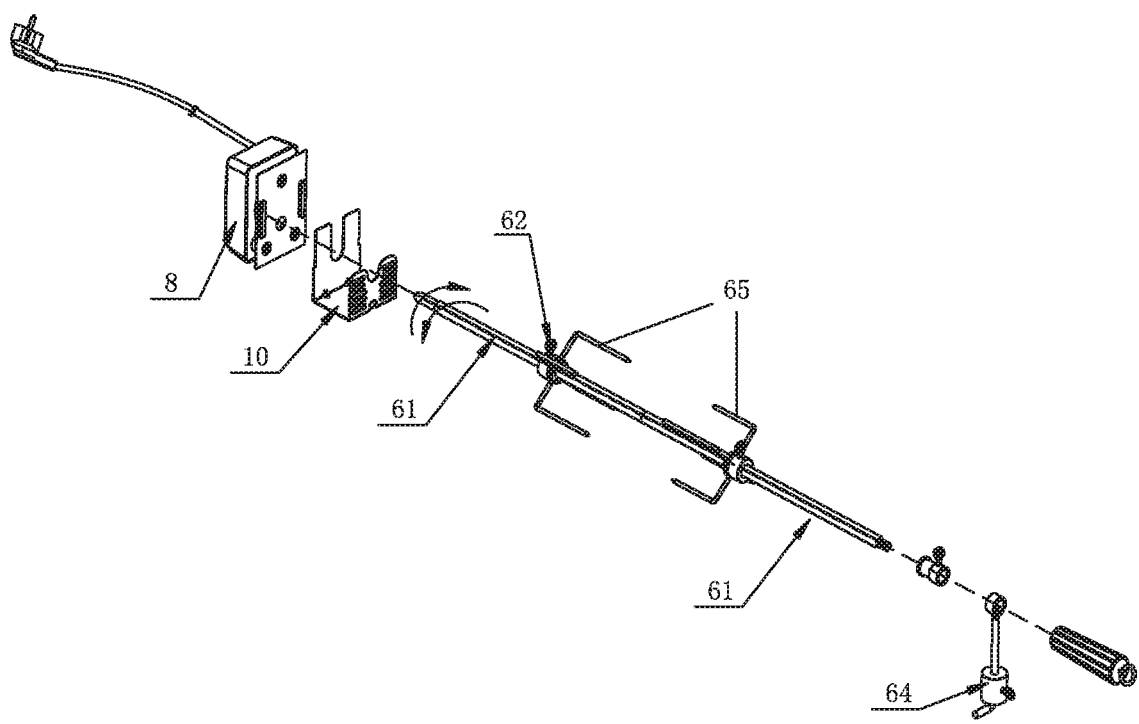
FIG. 5 is an exploded view of a barbeque rack, a mounting portion, a balancing handle and a drive motor of this disclosure.

With reference to FIGS. 2 and 5 for the barbeque rack 6 of this embodiment, the barbeque rack 6 comprises a rotating rod 61, a barbeque fork 62, a roller 63, and a balancing handle 64, and the barbeque fork 62 is installed to the rotating rod 61, and the rotating rod 61 is installed to the groove 9 through the roller 63, and the balancing handle 64 is installed to the rotating rod 61. During use, a user may use the balancing handle 64 to adjust the barbeque rack 6, and both left and right sides of the bottom of the cover 2 have a give-way portion 21, so that when the cover 2 covers the barbeque rack 6 of the machine 1, the give-way portions 21 can expose the drive motor 8 and the balancing handle 64 from the cover 2 to prevent the high temperature from damaging the drive motor 8 effectively. During the barbeque process, the balancing handle 64 may be used to adjust the height of the barbeque rack 6 manually.

In FIGS. 1 to 5, there are at least two barbeque forks 62, and each of the barbeque forks 62 includes a plurality of barbeque fork rods 65, and the barbeque forks 62 are uniformly distributed on the rotating rod 61. The more the barbeque fork rods 65, the more barbeque food can be fixed and cooked. To take the barbeque time and the taste of the barbeque food into consideration, it is recommended to have two barbeque forks 62, and each barbeque fork 62 has four barbeque fork rods 65, wherein the barbeque fork rods 65 are provided for fixing the barbeque food.

In FIGS. 1 to 5, the electric heating tray 4 comes with a plural quantity, and each of the electric heating trays 4 has a control switch 41 connected thereto. In an application, the quantity and position of the electric heating trays 4 may be changed to achieve the effects of saving energy, ensuring the taste of the barbeque food, and effectively preventing the barbeque food from producing harmful chemical substances caused by a too-high temperature or affecting the user's health.

In FIGS. 1 to 5, the electric heating trays 4 of this embodiment are stacked into a plurality of layers, and the number of layers of the electric heating trays 4 may be added according to different barbeques, so as to effectively increase the barbeque temperature and reduce the barbeque time.

In this embodiment, an oil basin is disposed at the bottom of the barbeque tray 3, and the top of the oil basin is in an open form. During the process of using the barbeque stove, the oil basin can effectively collect a liquid such as oil produced by the barbeque.

Figure 3:
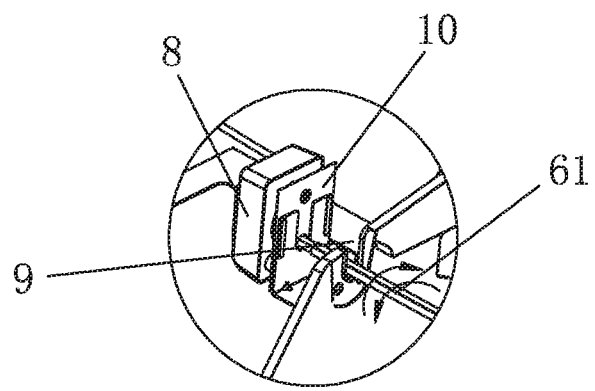
FIG. 3 is an exploded view of Section A of FIG. 2.
Figure 4:
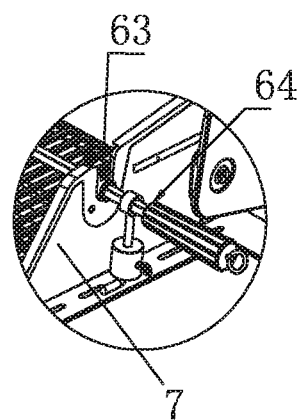
FIG. 4 is an exploded view of Section B of FIG. 2.

In FIGS. 1 and 3, the machine 1 of this embodiment has a mounting portion 10 for mounting a drive motor 8, and the drive motor 8 is mounted onto the mounting portion 10 by a screw, so as to effectively prevent the drive motor 8 from shifting or displacing during the operating process.

In FIG. 1, the cover 2 of this embodiment has a window 11 made of a transparent material and a ventilation hole 12 provided for ventilation, and the window 11 is provided for users to observe the barbeque process, and the ventilation hole 12 is provided for dissipating the gas produced by the barbeque.

Although a variety of examples and other information was used to explain aspects within the scope of the appended claims, no limitation of the claims should be implied based on particular features or arrangements in such examples, as one of ordinary skill would be able to use these examples to derive a wide variety of implementations. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rotary barbeque apparatus with a forward-reverse motor, comprising: a machine, a cover, a barbeque tray, an electric heating tray, a temperature detection device, and a barbeque rack, characterized in that the cover is movably coupled to the top of the machine; the barbeque tray is installed between the machine and the cover; both left and right ends of the machine have a protrusion, the electric heating tray is installed to the bottom of the protrusion; the protrusion has a groove formed thereon, both ends of the barbeque rack are rotatably and respectively coupled into the grooves of the protrusions; an end of the barbeque rack has a drive motor with an output end transmitted and coupled to the barbeque rack; the temperature detection device comprises a temperature sensor and a temperature control device, the temperature sensor sends a detected temperature to the temperature control device through a transmission cable;

the drive motor is a forward-reverse motor; and the electric heating tray comes with a plural quantity, and each of the electric heating trays is coupled to a control switch.

2. The rotary barbeque apparatus with a forward-reverse motor of claim 1, wherein the barbeque rack comprises a rotating rod, a barbeque fork, a roller, and a balancing handle, and the barbeque fork is installed to the rotating rod, and the rotating rod is installed to the groove through the roller, and the balancing handle is installed to the rotating rod.

3. The rotary barbeque apparatus with a forward-reverse motor of claim 2, wherein the barbeque fork comes with a quantity of at least two, and the barbeque forks are uniformly distributed on the rotating rod, and each of the barbeque forks includes a plurality of barbeque fork rods.

4. The rotary barbeque apparatus with a forward-reverse motor of claim 1, wherein the cover has a give-way portion disposed on both left and right sides of the bottom of the cover.

5. The rotary barbeque apparatus with a forward-reverse motor of claim 1, wherein the electric heating trays are stacked into a plurality of layers.

6. The rotary barbeque apparatus with a forward-reverse motor of claim 1, wherein the barbeque tray has an oil basin disposed at the bottom of the barbeque tray for collecting a barbeque waste oil, and the top of the oil basin is in an open form.

7. The rotary barbeque apparatus with a forward-reverse motor of claim 1, wherein the machine has a mounting portion disposed thereon for installing the drive motor, and the drive motor is installed to the mounting portion by a screw.

8. The rotary barbeque apparatus with a forward-reverse motor of claim 1, wherein the temperature control device includes a display screen.

9. The rotary barbeque apparatus with a forward-reverse motor of claim 1, wherein the cover has a window made of a transparent material, and a ventilation hole provided for ventilation.

* * * * *